Sept. 12, 1933.  W. C. HEDGCOCK  1,926,678
TRUCK
Filed May 4, 1932  4 Sheets-Sheet 1

Inventor:
William C. Hedgcock,
By Wilkinson, Huxley, Byron & Knight attys.

Sept. 12, 1933.  W. C. HEDGCOCK  1,926,678
TRUCK
Filed May 4, 1932  4 Sheets-Sheet 2
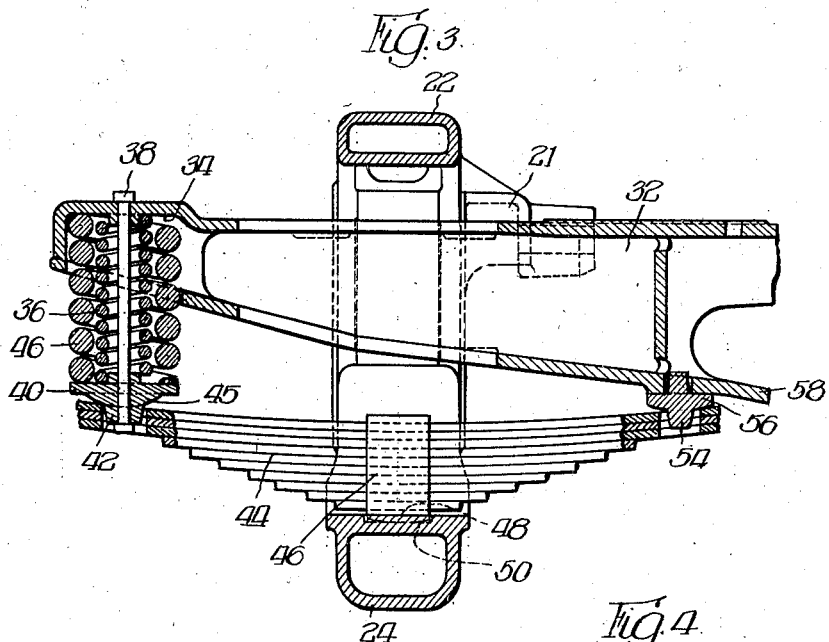
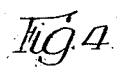
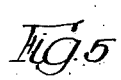
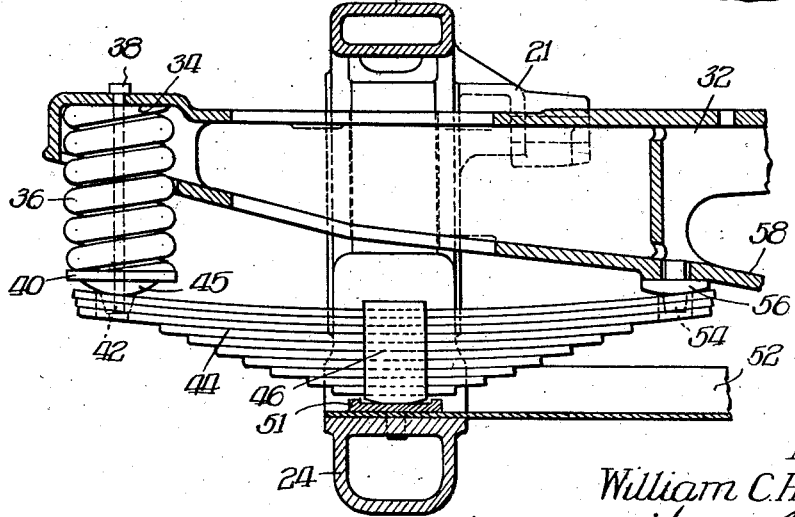
Inventor
William C. Hedgcock, Sept. 12, 1933.  W. C. HEDGCOCK  1,926,678
TRUCK
Filed May 4, 1932  4 Sheets-Sheet 3

Inventor
William C. Hedgcock,
By Wilkinson, Huxley, Byron & Knight
Attys.

Sept. 12, 1933.   W. C. HEDGCOCK   1,926,678
TRUCK
Filed May 4, 1932   4 Sheets-Sheet 4

Inventor:
William C. Hedgcock,
By Wilkinson, Huxley, Byron & Knight
Attys.

Patented Sept. 12, 1933

1,926,678

UNITED STATES PATENT OFFICE 1,926,678

TRUCK

William C. Hedgcock, Wilmette, Ill., assignor to American Steel Foundries, Chicago, Ill., a corporation of New Jersey Application May 4, 1932. Serial No. 609,190

20 Claims. (Cl. 105—197)

This invention pertains to car trucks.

An object of this invention is to provide a car truck wherein a load carrying member is provided for maintaining the truck in squared relation.

Another object is to provide a truck construction wherein a load carrying member in the nature of a bolster is provided, the bolster and side frames having means for maintaining the truck in squared relation.

Still another object of the invention is to provide a truck construction wherein a load carrying member is provided, said member and the side frames being provided with guide cooperating surfaces of increased capacity for maintaining the truck in squared relation.

A further object of the invention is to provide a truck construction wherein a load carrying member is provided cooperating with the side frames, the guide cooperating surfaces between the load carrying member and side frames being arranged to prevent crimping action which usually occurs between the guide cooperating surfaces, for example, when the conventional truck is negotiating a curve.

With these and various other objects in view, the invention may consist of certain novel features of construction and operation as will be more fully described and particularly pointed out in the specification, drawings and claims appended hereto.

In the drawings which illustrate embodiments of the device and wherein like reference characters are used to designate like parts—

Figure 3 is a transverse fragmentary sectional elevation taken substantially in the plane of the transverse center line of the truck construction shown in Figures 1 and 2;

Figure 4 is a fragmentary sectional top plan view through the column guides and the guide cooperating surfaces of the bolster of the truck construction shown in Figures 1 to 3 inclusive;

Figure 5 is a transverse sectional elevation corresponding substantially to Figure 3 showing the application of the invention to a modified form of truck construction wherein a spring plank is used;

Figure 1:
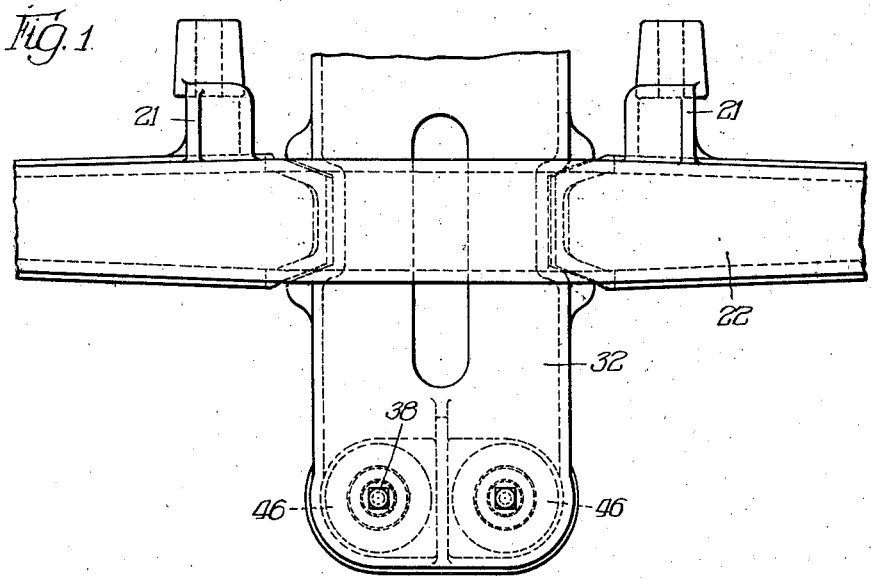
Figure 1 is a fragmentary top plan view of a truck construction embodying the invention.
Figure 2:
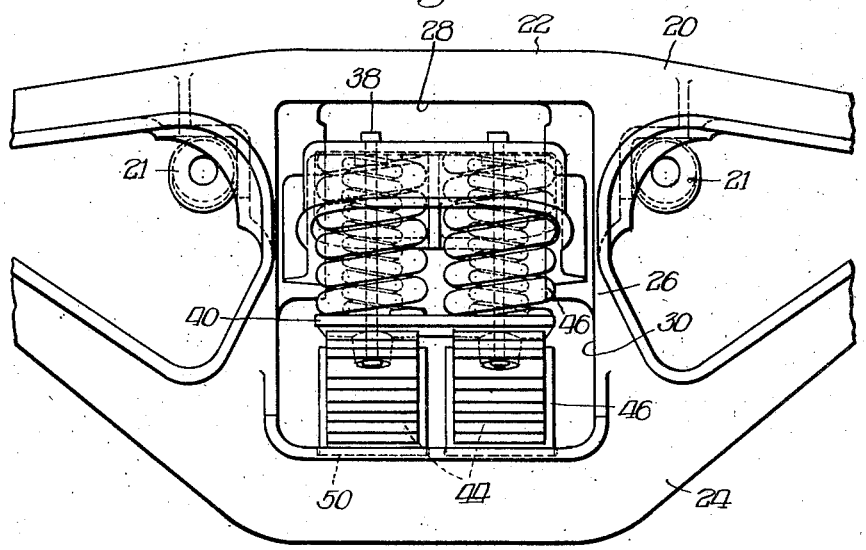
Figure 2 is a fragmentary side elevation of the truck construction shown in Figure 1.

Referring first of all more particularly to the construction shown in Figures 1 to 5 inclusive, the truck side frame 20 having the brake hanger brackets 21 is provided with the compression member 22, the tension member 24 merging adjacent the ends thereof and provided with journal boxes (not shown). The tension and compression members are integrally connected by means of the spaced column guides 26 forming a bolster opening or window 28. The column guides are more widely spaced adjacent the bottom of said window as at 30 for facilitating assembly of the bolster 32 therein. The bolster, provided with the usual center and side bearings extends through the window and is provided with the seat 34 for the reception of the coil spring nest 36, the said nest being positioned by means of the tie rod 38 extending between the bolster spring seat and the seat 40 provided with the positioning dowel 42 receiver in a suitable aperture in the outer end of the semi-elliptic leaf spring assembly 44, said seat preferably having the arcuate spring engaging seat 45.

The spring assembly is provided with the spring band 46 having an arcuate lower seat cooperating surface 48 seated in the seat 50 provided in the tension member between the column guides. In the modification shown in Figure 5, the seat 51 is provided on the spring plank 52 for accommodating the spring band 46, the spring plank being disposed between the side frames for maintaining the truck in square relation. The inner leg of the leaf spring assembly is suitably apertured for the reception of the positioning dowel 54 of the arcuate seat 56 provided on the lower chord 58 of the bolster 32.

It has been found in service that an ordinary truck provided with the usual column guides and the cooperating surfaces on the bolster gets out of square relation due to the fact that in negotiating a curve, crimping takes place between the bolster and the guide columns whereby the bolster and side frame lose their square relation to each other. In order to prevent distortion between the guide cooperating surfaces, a construction is used wherein it is possible to greatly increase the effective areas of these surfaces over the conventional type of side frame and bolster construction.

The column guides 26 are formed so that they are substantially U-shaped in section (such as shown in Figure 4), the legs of the U being diverging and preferably disposed so that opposite legs, such as the inner leg 60 and the outer leg 62, and the outer leg 64 and the inner leg 66, of opposite columns are in the same planes, the planes preferably intersecting adjacent the longitudinal center line of the bolster. The bolster is formed with complementary guide cooperating surfaces, the U-shaped member 68 so formed extending inwardly of the sides of the bolster, reenforcing ribs or members 70 being provided to increase the guide cooperating surfaces.

Figure 6:
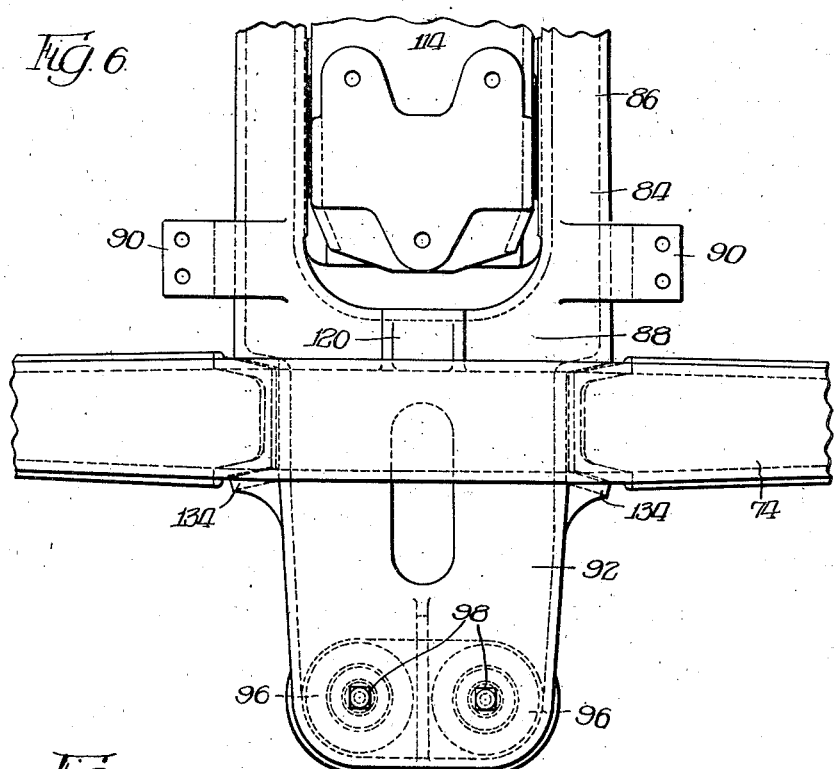
Figure 6 is a fragmentary top plan view of a modified form of truck construction embodying the invention.
Figure 7:
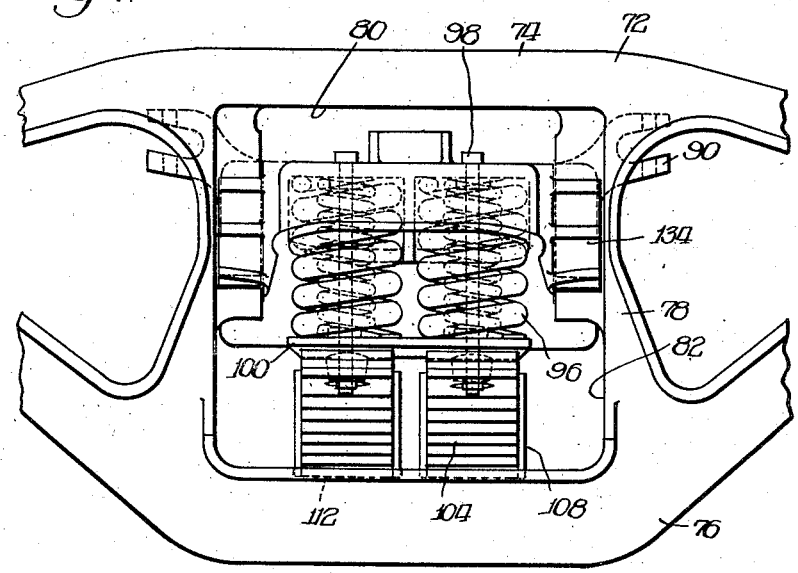
Figure 7 is a fragmentary side elevation of the truck construction illustrated in Figure 6.
Figure 8:
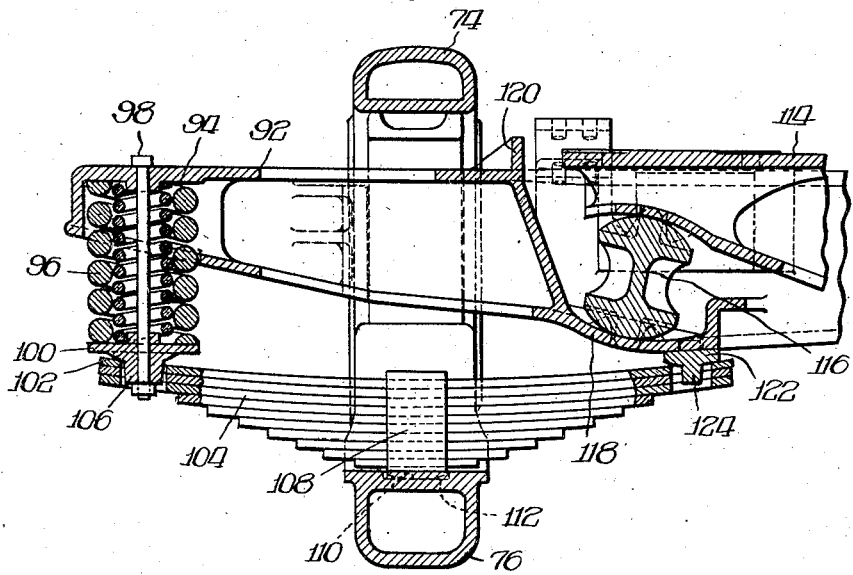
Figure 8 is a fragmentary transverse sectional elevation of the truck construction illustrated in Figures 6 and 7, the section being taken substantially in the plane of the transverse center line of the truck.
Figure 9:
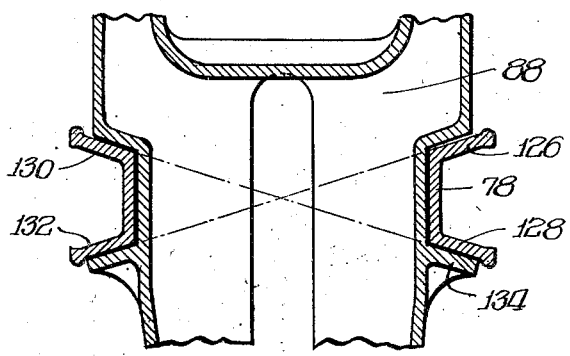
Figure 9 is a fragmentary top plan view of the truck construction shown in Figures 6, 7 and 8 showing the cooperation between the transom and column guides.

In the construction illustrated in Figures 6 to 9 inclusive, the side frame 72 is similar to the side frame 20, being provided with the compression member 74, the tension member 76 merging adjacent the ends thereof and provided with the journal boxes (not shown) for cooperation with the journal ends of wheel and axle assemblies. The tension and compression members are integrally connected by means of the spaced column guides 78 forming the window 80 with said tension and compression members. As before, the column guides are more widely spaced adjacent the bottom of said window, as at 82, to facilitate the assembly of the transom 84 with said side frame. The transom includes the spaced members 86 integrally connected adjacent the ends thereof as at 88 and provided with brake hanger brackets 90.

The transom is provided with the portion 92 extending through the window and provided with the seat 94 for the reception of the coil spring nests 96, said nests being positioned by means of the tie rod 98 disposed between the transom and the seat 100. The seat 100 is provided with the arcuate portion 102 adapted to seat on the outer end of the semi-elliptic leaf spring assembly 104 being positioned thereon by means of the depending dowel 106. The spring assembly is provided with the spring band 108 having an arcuate lower seat cooperating surface 110 seated in the seat 112 provided on the tension member between the column guides. The bolster 114 provided with the usual center and side bearings is disposed between the spaced members 86 of the transom and is supported on the rocker 116 carried on the seat 118 integrally connecting the spaced members 96. The end portion 88 of the transom is provided with the stop 120 for limiting movement of the bolster.

The transverse seat 118 is provided with the arcuate spring seat 122 provided with the depending positioning dowel 124 adapted to be received in a suitable aperture of the inner leg of the leaf spring assembly 104. As before, the spaced column guides 78 are U-shaped in section and provided with the flared or diverging legs 126—128—130—132, opposite legs 126 and 132, and 128 and 130 being disposed in the same planes, the planes preferably intersecting adjacent the longitudinal center line of the transom. The transom is offset inwardly adjacent the connecting portion 88 to extend between the column guides, being provided with the outwardly flared reenforced lug or column guide cooperating members 134 forming a substantially U-shaped column guide cooperating portion complementarily disposed to said column guides.

With the constructions shown, which are similar to those shown in applications Serial Nos. 559,617 and 559,618, each filed August 27, 1931, of which this application is a continuation in part, the springs of different character operate to dampen each other's vibrations so that there will be no tendency for the oscillations to synchronize to build up the vibrations. Where no spring plank is used the increased effective guide cooperating surfaces at the side of the columns prevent crimping between the bolster and/or transom and side frame, and where a spring plank is used a more rigid assembly is provided, still maintaining the bolster and transom resiliently supported on the side frame, thus providing a truck of easy riding qualities, and one which will be maintained in squared relation with less opportunity for damage to the sliding parts.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a truck, the combination of a side frame including tension and compression members and spaced column guides integrally connecting said members and forming a window, a bolster extending into said window, said column guides and bolster having sliding cooperating surfaces angularly disposed with respect to the center line of the side frame, the inner surfaces of one of said column guides being co-planar with the outer surfaces of the other of said column guides for a portion of the length thereof.

2. In a truck, the combination of a side frame including tension and compression members and spaced column guides integrally connecting said members and forming a window, a bolster extending into said window, said column guides and bolster having sliding cooperating surfaces disposed to prevent crimping therebetween upon tendency for angular movement between said bolster and side frame, the inner surfaces of one of said column guides being aligned with the outer surfaces of the other of said column guides for a portion of the length thereof.

3. In a truck, the combination of a side frame including tension and compression members and spaced column guides integrally connecting said members and forming a window, a bolster extending into said window, said column guides and bolster having sliding cooperating surfaces interrupting the planes defining the side walls of the bolster, the inner surfaces of one of said column guides being aligned with the outer surfaces of the other of said column guides for a portion of the length thereof.

4. In a truck, the combination of a side frame including tension and compression members and spaced column guides integrally connecting said members and forming a window, a bolster extending into said window, said column guides and bolster having flaring sliding cooperating surfaces, the inner surfaces of one of said column guides being aligned with the outer surfaces of the other of said column guides for a portion of the length thereof.

5. In a truck, the combination of a side frame including tension and compression members and spaced column guides integrally connecting said members and forming a window, a bolster extending into said window, said column guides and bolster having outwardly flaring sliding cooperating surfaces, the inner surfaces of one of said column guides being aligned with the outer surfaces of the other of said column guides for a portion of the length thereof.

6. In a truck, the combination of a side frame including tension and compression members and integral connecting column guides, a load carrying member having column guide cooperating portions, said load carrying member being wider than the distance between said column guides, the inner surfaces of one of said column guides being aligned with the outer surfaces of the other of said column guides for a portion of the length thereof.

7. In a truck, the combination of a side frame including tension and compression members and integral connecting column guides, a load carrying member having column guide cooperating portions, said load carrying member being wider than the distance between said column guides, said column guides having flaring side bearing portions, the inner surfaces of one of said column guides being aligned with the outer surfaces of the other of said column guides for a portion of the length thereof.

8. In a truck, the combination of a side frame including tension and compression members and integral connecting column guides, a transom having column guide cooperating portions, said transom being wider than the distance between said column guides, the inner surfaces of one of said column guides being aligned with the outer surfaces of the other of said column guides for a portion of the length thereof.

9. In a truck, the combination of a side frame including tension and compression members and integral connecting column guides, a bolster having column guide cooperating portions, said bolster being wider than the distance between said column guides, the inner surfaces of one of said column guides being aligned with the outer surfaces of the other of said column guides for a portion of the length thereof.

10. In a truck, the combination of a side frame including tension and compression members and integral connecting column guides, a transom having column guide cooperating portions, said transom being wider than the distance between said column guides, said column guides having flaring side bearing portions, the inner side bearing portion of one of said column guides being aligned with the outer side bearing portions of the other of said column guides.

11. In a truck, the combination of a side frame including tension and compression members and integral connecting column guides, a bolster having column guide cooperating portions, said bolster being wider than the distance between said column guides, said column guides having flaring side bearing portions, the inner side bearing portion of one of said column guides being aligned with the outer side bearing portions of the other of said column guides.

12. A side frame having spaced guide columns, said columns having oppositely arranged diverging guiding portions, the inner of the guiding portions of one of said columns being aligned with the outer of the guiding portions of the other of said columns.

13. A side frame having spaced guide columns, said columns having oppositely arranged diverging guiding portions, opposite portions of opposite columns being arranged substantially in a common plane.

14. In a side frame, the combination of tension and compression members and integrally formed spaced guide columns forming a window, said columns having guiding portions in said window diverging outwardly thereof, the inner of the guiding portions of one of said columns being aligned with the outer of the guiding portions of the other of said columns.

15. A bolster having diverging column guide cooperating portions, opposite faces of opposite portions being disposed in substantially a common plane.

16. A bolster having diverging column guide cooperating portions, opposite faces of opposite portions being disposed in substantially a common plane, the planes of said portions intersecting substantially on the longitudinal center line of said bolster.

17. A transom having diverging column guide cooperating portions, opposite faces of opposite portions being disposed in substantially a common plane.

18. A transom having diverging column guide cooperating portions, opposite faces of opposite portions being disposed in substantially a common plane, the planes of said portions intersecting substantially on the longitudinal center line of said bolster.

19. In a spring-plankless truck, the combination of spaced side frames each including tension and compression members and spaced columns integrally connecting said members and forming a window, a load carrying member serving as the sole connection between said side frames, said load carrying member extending into each window and having portions having sliding cooperation with angularly disposed surfaces provided on said columns, the inner surfaces of the columns of each of said side frames being co-planar with the outer surfaces of the other of the columns for a portion of the length thereof.

20. In a spring-plankless truck, the combination of spaced side frames each having spaced columns, said columns having angularly disposed guide surfaces, the inner surfaces of one of the columns of each of the side frames being co-planar with the outer surfaces of the other of said columns for a portion of the length thereof, and a load carrying member forming the sole connection between said side frames, said load carrying member having cooperating surfaces slidably cooperating with the surfaces of said columns.

WILLIAM C. HEDGCOCK.